No. 770,311. PATENTED SEPT. 20, 1904.
C. H. PLUMMER.
CORN SILKER.
APPLICATION FILED FEB. 1, 1904.
NO MODEL.

WITNESSES:

INVENTOR
Clarence H. Plummer
BY Erwin & Wheeler
ATTORNEYS

No. 770,311. Patented September 20, 1904.

UNITED STATES PATENT OFFICE.

CLARENCE H. PLUMMER, OF KEWAUNEE, WISCONSIN.

CORN-SILKER.

SPECIFICATION forming part of Letters Patent No. 770,311, dated September 20, 1904.

Application filed February 1, 1904. Serial No. 191,421. (No model.)

*To all whom it may concern:*

Be it known that I, CLARENCE H. PLUMMER, a citizen of the United States, residing at Kewaunee, county of Kewaunee, and State of Wisconsin, have invented new and useful Improvements in Corn-Silkers, of which the following is a specification.

My invention relates to improvements in corn-silkers.

The object of my invention is to provide efficient and inexpensive means for removing the silk, broken pieces of cob, and husks from green corn which has been cut or otherwise removed from the cob preparatory to canning the same.

In the following description reference is had to the accompanying drawings, in which—

Figure 1:
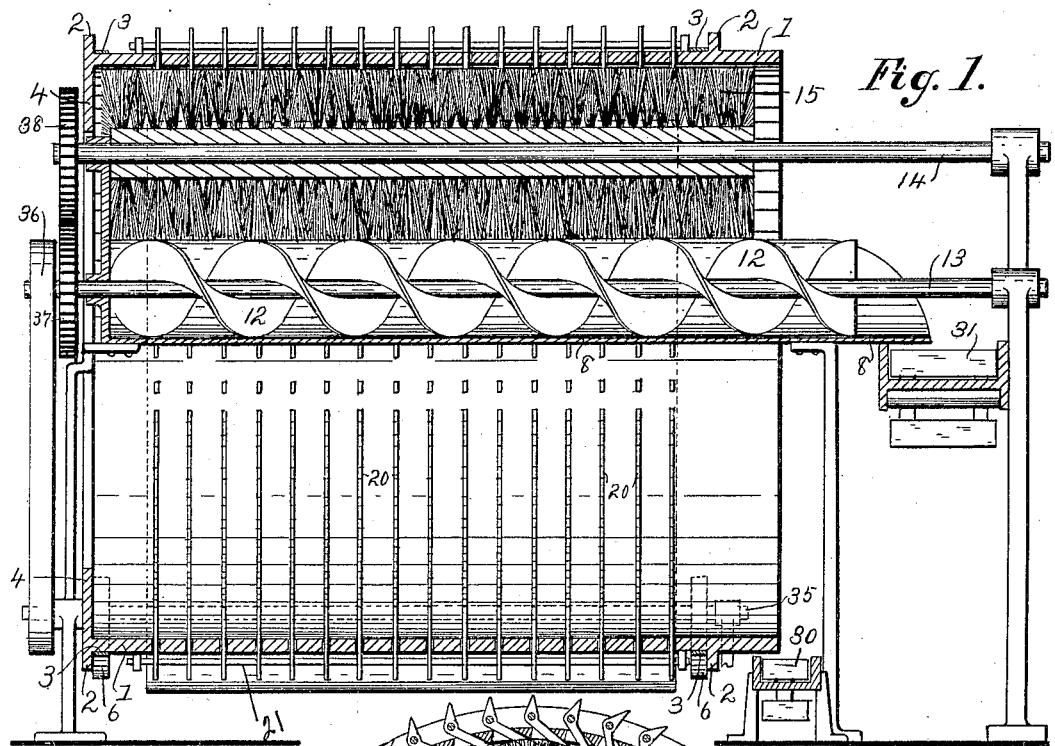
Figure 2:
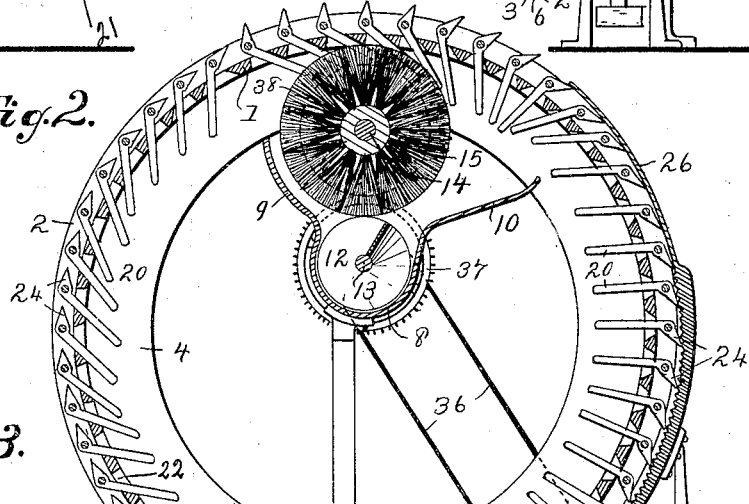
Figure 3:
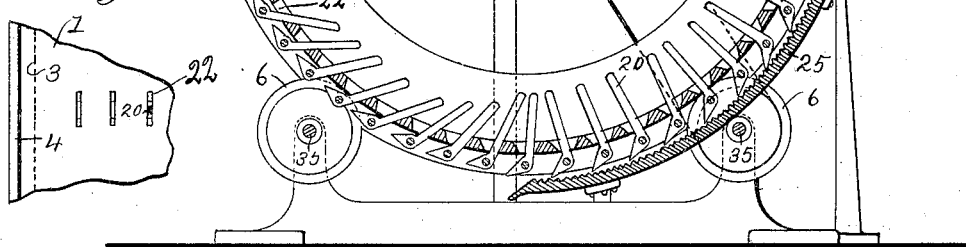

Figure 1 is a longitudinal sectional view of my invention. Fig. 2 is a cross-sectional view of the same. Fig. 3 is a detail view of the slotted inner face of the drum.

Like parts are identified by the same reference characters throughout the several views.

A rotary drum 1 is provided with outwardly-projecting flanges 2 and peripheral rings or bands 3 near the respective ends of the drum. The drum is also provided at its front end with an inwardly-projecting flange 4. The drum is mounted upon supporting driving-pulleys 6, the flanges 2 serving to hold the drum in position on the pulleys with the rings 3 bearing upon the pulley-surfaces. A stationary trough 8 extends longitudinally through the upper portion of the drum and is provided with flaring side walls 9 and 10, as best shown in Fig. 2. The lower portion of the trough is provided with a screw conveyer 12, mounted upon a driving-shaft 13, and upon the conveyer a second shaft 14 supports and operates a rotary brush 15. The wall of the drum is slotted and provided with annular rows of inwardly-projecting gathering-fingers 20, which are pivotally supported at 21 and project through the slots 22 in the drum. The outer ends of the gathering-fingers 20 are provided with arms 24, having a pitch in a direction opposite that of drum rotation, and these arms are arranged to trail along the corrugated surface of a segmental sheet-metal shield 25 as the drum is rotated. The shield 25 extends from a point underneath the drum partially around its upwardly-moving side to a point somewhat above the horizontal center of the drum. From the upper edge of the corrugated shield 25 a smooth-surfaced segmental shield 26 extends to a point nearly in a vertical plane projected upwardly from the outer edge of the side 10 of the conveyer-trough. This shield forms a continuation of the shield 25, but is formed with a slight inward curve in the direction of the drum, being closer to the drum at its upper edge than at its lower edge. The curve is so proportioned as to oscillate the fingers 20 on their pivots through the medium of the arms 24, whereby the fingers are kept in an approximately horizontal position until carried by the continued rotation of the drum above the conveyer-trough and beyond the shield 26, when they drop by gravity and hang in a substantially vertical position, thus permitting the discharge of the material carried by the fingers into the conveyer-trough. The brush 15 is positioned to remove the residuum, and the conveyer 12 is preferably positioned for contact with the lower side of the brush, thus also serving to clean the brush. The vibration of the fingers 20, caused by the arms 24 trailing over the corrugated shield 26, releases the corn, but is not sufficient to release the silk and other waste material. The corn is discharged at the end of the drum into the conveyer-trough 30, while the waste material is discharged by the screw conveyer 12 into a conveyer-trough 31. The troughs 30 and 31 lead to any suitable point of final delivery.

In Fig. 1 motion-transmitting connections are illustrated. The driving-shafts 35, on which the pulleys 6 are mounted, are driven from any suitable source of power, and motion is transmitted from one of these shafts to the shaft 13 of the screw conveyer by means of a belt 36 and suitable pulleys on the shafts. Motion is communicated from the shaft 13 to the shaft 14 of the brush by means of gear-wheels 37 and 38, respectively.

Having thus described my invention, what I claim as new, and desire to secure by Letters Patent, is—

1. The combination with a rotary drum, of a series of inwardly-projecting gathering-fingers connected therewith; means for vibrating said gathering-fingers; and means for collecting and removing the material carried by said fingers to the upper portion of the drum.

2. The combination with a rotary drum, of a series of annular rows of inwardly-projecting gathering-fingers; means for vibrating said fingers on the side of upward movement; and means for collecting and removing the material carried by said fingers when the latter reach the upper portion of the circle of revolution.

3. The combination with a rotary drum, of a series of rows of inwardly-projecting gathering-fingers; outwardly-projecting arms, connected with said fingers; a corrugated segmental shield, arranged in the path of said arms, whereby said fingers are caused to vibrate by contact of the arms with such shield; and mechanism for removing the material carried by said fingers after passing said shield.

4. The combination with a rotary drum, of a series of rows of inwardly-projecting gathering-fingers; outwardly-projecting trailing arms, connected with said fingers; a corrugated segmental shield, arranged in the path of said arms, whereby said fingers are caused to vibrate by contact of the arms with such shield; and mechanism for removing the material carried by said fingers after passing said shield.

5. The combination with a rotary drum, a series of rows of inwardly-projecting gathering-fingers; outwardly-projecting arms, connected with said fingers; a corrugated segmental shield, arranged in the path of said arms, whereby said fingers are caused to vibrate by contact of the arms with such shield; and mechanism for removing the material carried by said fingers after passing said shield; together with a smooth-surfaced segmental shield, located above the corrugated shield, and arranged to hold the gathering-fingers in position to support the silk, and other materials carried thereby, until the fingers reach a point above the silk-removing mechanism.

6. The combination with a series of annular rows of silk-collecting fingers, mounted upon a suitable rotary support; a stationary shield, formed with projections in the path of portions of said fingers, whereby such fingers are caused to vibrate in passing the projections; said shield being located for contact with the fingers during their upward movement; and mechanism for collecting the material discharged from said fingers after passing such shield.

7. The combination with a rotary drum, of a series of annular rows of inwardly-projecting fingers, pivotally connected with the drum and extending through suitable slots therein; said fingers having exteriorly-projecting arms; a stationary shield provided with projections in the path of said arms on the side of upward movement; a smooth-surfaced shield, above said first-mentioned shield, and arranged with an outwardly-curving surface approaching the drum in the direction of drum revolution; the inner portions of said fingers being heavier and adapted to cause said fingers to drop and hang by gravity within the drum when released from said shields; a collecting-trough, located within the drum and adapted to receive the material from said fingers when the latter are released from the upper shield; and a conveyer for removing the material longitudinally.

In testimony whereof I affix my signature in the presence of two witnesses.

CLARENCE H. PLUMMER.

Witnesses:
LEVERETT C. WHEELER,
JAS. B. ERWIN.